(12) United States Patent
Zhang et al.

(10) Patent No.: US 10,590,027 B2
(45) Date of Patent: Mar. 17, 2020

(54) HIGH PERFORMANCE GLASS FIBER COMPOSITION, AND GLASS FIBER AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 16/081,350

(22) PCT Filed: Mar. 21, 2016

(86) PCT No.: PCT/CN2016/076885
§ 371 (c)(1),
(2) Date: Aug. 30, 2018

(87) PCT Pub. No.: WO2016/165531
PCT Pub. Date: Oct. 20, 2016

(65) Prior Publication Data
US 2019/0077699 A1  Mar. 14, 2019

(30) Foreign Application Priority Data
Mar. 15, 2016 (CN) .............................. 201610146263

(51) Int. Cl.
*C03C 3/095* (2006.01)
*C03C 13/00* (2006.01)
*C03C 3/085* (2006.01)
*C03C 3/087* (2006.01)

(52) U.S. Cl.
CPC ............. *C03C 3/095* (2013.01); *C03C 3/085* (2013.01); *C03C 3/087* (2013.01); *C03C 13/00* (2013.01)

(58) Field of Classification Search
CPC ......... C03C 3/085; C03C 3/087; C03C 3/095; C03C 13/00; C03C 13/001; C03C 13/006; C03C 13/06
See application file for complete search history.

(56) References Cited

U.S. PATENT DOCUMENTS

| | | |
|---|---|---|
| 2007/0158317 A1 | 7/2007 | Brix et al. |
| 2015/0018194 A1 | 1/2015 | Li et al. |
| 2016/0068428 A1 | 3/2016 | Li et al. |
| 2016/0152514 A1 | 6/2016 | Li et al. |
| 2018/0118608 A1 | 5/2018 | Zhang et al. |
| 2018/0179104 A1* | 6/2018 | Zhang ..................... C03C 13/00 |
| 2019/0100453 A1* | 4/2019 | Zhang ..................... C03C 3/087 |

FOREIGN PATENT DOCUMENTS

| | | |
|---|---|---|
| CN | 103086605 A | 5/2013 |
| CN | 105016622 A | 11/2015 |
| CN | 105392744 A | 3/2016 |
| CN | 105693100 A | 6/2016 |
| EP | 3406576 A2 | 11/2018 |
| EP | 3415474 A2 | 12/2018 |
| JP | S60141642 A | 7/1985 |
| JP | 2007015915 A | 1/2007 |
| JP | 2011011933 A | 1/2011 |
| SU | 1273339 A1 | 11/1986 |

OTHER PUBLICATIONS

Derwent Abstract 1987-211948, 1987 (Year: 1987).*
From PCT/CN2016/076885, Written Opinion of the International Searching Authority, dated Dec. 6, 2016, with English translation from WIPO.
From PCT/CN2016/076885, International Preliminary Report on Patentability, dated Sep. 18, 2018, with English translation from WIPO.
From CN 2016101462632, First Office Action and Search Report, dated Nov. 17, 2017, with machine English translation from Global Dossier.
International Search Report for PCT/CN2016/076885, dated Dec. 6, 2016, and its English translation provided by WIPO.
Written Opinion of the International Search Authority for PCT/CN2016/076885, dated Dec. 6, 2016 and its English translation provided by Bing.com Microsoft Translator.
Extended European Search Report from EP app. No. 16779506.1, dated Feb. 13, 2019.
Notice of Reasons for Refusal from JP app. No. 2018548181, dated Aug. 20, 2019, with English translation from Global Dossier.

* cited by examiner

Primary Examiner — Elizabeth A. Bolden
(74) Attorney, Agent, or Firm — Ladas & Parry, LLP

(57) ABSTRACT

Provided are a high performance glass fiber composition, and a glass fiber and a composite material thereof. The content, given in weight percentage, of each component of the glass fiber composition is as follows: 52-67% of $SiO_2$, 12-24% of $Al_2O_3$, 0.05-4.5% of $Sm_2O_3+Gd_2O_3$, less than 2% of $Li_2O+Na_2O+K_2O$, 10-24% of $CaO+MgO+SrO$, less than 16% of CaO, less than 13% of MgO, less than 3% of $TiO_2$, and less than 1.5% of $Fe_2O_3$. The composition significantly improves the mechanical properties and the thermal stability of glass, significantly reduces the liquidus temperature and forming temperature of glass, and under equal conditions, significantly reduces the crystallisation rate of glass. The composition is particularly suitable for the tank furnace production of a high performance glass fiber having excellent thermal stability.

16 Claims, No Drawings

HIGH PERFORMANCE GLASS FIBER COMPOSITION, AND GLASS FIBER AND COMPOSITE MATERIAL THEREOF

CROSS-REFERENCE TO RELATED APPLICATIONS

This application is the U.S. national phase of PCT Application No. PCT/CN2016/076885, filed on Mar. 21, 2016, which claims the priority to Chinese Patent Application No. 201610146263.2 filed Mar. 15, 2016, the disclosures of which are incorporated herein by reference in their entireties.

BACKGROUND OF THE INVENTION

Field of the Invention

The present invention relates to a glass fiber, a composition for producing the same, and a composite material comprising the same.

Description of the Related Art

Glass fiber is an inorganic fiber material that can be used to reinforce resins to produce composite materials with good performance. As a reinforcing base material for advanced composite materials, high-performance glass fibers were originally used mainly in the aerospace industry or the national defense industry. With the progress of science and technology and the development of economy, high-performance glass fibers have been widely used in civil and industrial fields such as wind blades, pressure vessels, offshore oil pipes and auto industry.

The original high-performance glass compositions were based on an $MgO$—$Al_2O_3$—$SiO_2$ system and a typical solution was S-2 glass of American company OC. The modulus of S-2 glass is 89-90 GPa; however, the production of this glass is excessively difficult, as its forming temperature is up to about 1571° C. and its liquidus temperature up to 1470° C. and therefore it is difficult to realize large-scale industrial production. Thus, OC stopped production of S-2 glass fiber and transferred its patent to American company AGY.

Thereafter, OC developed HiPer-tex glass having a modulus of 87-89 GP, which were a trade-off for production scale by sacrificing some of the glass properties. However, as the design solution of HiPer-tex glass was just a simple improvement over that of S-2 glass, the forming temperature and liquidus temperature remained high, which causes difficulty in attenuating glass fiber and consequently in realizing large-scale industrial production. Therefore, OC also stopped production of HiPer-tex glass fiber and transferred its patent to the European company 3B.

French company Saint-Gobain developed R glass that is based on an $MgO$—$CaO$—$Al_2O_3$—$SiO_2$ system, and its modulus is 86-89 GPa; however, the total contents of $SiO_2$ and $Al_2O_3$ remain high in the traditional R glass, and there is no effective solution to improve the crystallization performance, as the ratio of Ca to Mg is inappropriately designed, thus causing difficulty in fiber formation as well as a great risk of crystallization, high surface tension and fining difficulty of molten glass. The forming temperature of the R glass reaches 1410° C. and its liquidus temperature up to 1350° C. All these have caused difficulty in effectively attenuating glass fiber and consequently in realizing large-scale industrial production.

In China, Nanjing Fiberglass Research & Design Institute developed an HS2 glass having a modulus of 84-87 GPa. It primarily contains $SiO_2$, $Al_2O_3$ and MgO while also including certain amounts of $Li_2O$, $B_2O_3$, $CeO_2$ and $Fe_2O_3$. Its forming temperature is only 1245° C. and its liquidus temperature is 1320° C. Both temperatures are much lower than those of S glass. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

To sum up, we find that, at present stage, the actual production of various high-performance glass fibers generally faces the difficulty of large-scale production with refractory-lined furnaces, specifically manifested by relatively high liquidus temperature, high rate of crystallization, relatively high forming temperature, refining difficulty of molten glass and a narrow temperature range ($\Delta T$) for fiber formation and even a negative $\Delta T$ value. Therefore, most companies tend to reduce the production difficulty by compromising some of the glass properties, thus making it impossible to improve the strength and modulus of the above-mentioned glass fibers with the growth of production scale.

SUMMARY OF THE INVENTION

It is one objective of the present disclosure to provide a composition for producing a glass fiber. The resulting glass fiber has greatly increased mechanical properties and thermal stability; also, the composition for producing a glass fiber significantly lowers the liquidus and forming temperatures, crystallization rate and refining difficulties of the glass.

The composition according to the present invention is particularly suitable for large-scale production of glass fiber having excellent thermal stability with refractory-lined furnaces.

To achieve the above objective, in accordance with one embodiment of the present disclosure, there is provided a composition for producing glass fiber, the composition comprising percentage amounts by weight, as follows:

| | |
|---|---|
| $SiO_2$ | 52-67% |
| $Al_2O_3$ | 12-24% |
| $Sm_2O_3 + Gd_2O_3$ | 0.05-4.5% |
| $R_2O = Li_2O + Na_2O + K_2O$ | <2% |
| $CaO + MgO + SrO$ | 10-24% |
| $CaO$ | <16% |
| $MgO$ | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the content range of $Li_2O$ is 0.1-1.5% in percentage amounts by weight.

In a class of this embodiment, the composition contains $Y_2O_3$ in a content of 0.05-5% in percentage amounts by weight.

In a class of this embodiment, the composition contains $La_2O_3$ in a content of 0.05-3% in percentage amounts by weight.

In a class of this embodiment, the total weight percentage of $SiO_2+Al_2O_3$ is less than 82%.

In a class of this embodiment, the total weight percentage of $SiO_2+Al_2O_3$ is 70-81%.

In a class of this embodiment, the content range of MgO is 6-12% in percentage amounts by weight.

In a class of this embodiment, the content range of $Sm_2O_3$ is 0.05-3% in percentage amounts by weight.

In a class of this embodiment, the content range of $Gd_2O_3$ is 0.05-2% in percentage amounts by weight.

In a class of this embodiment, the total weight percentage of $Sm_2O_3+Gd_2O_3$ is 0.1-4%.

In a class of this embodiment, the weight percentage ratio $C1=(Li_2O+Sm_2O_3+Gd_2O_3)/Al_2O_3$ is greater than or equal to 0.02.

In a class of this embodiment, the composition comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| $CaO + MgO + SrO$ | 10-24% |
| CaO | <16% |
| MgO | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the composition comprises the following components expressed as percentage amounts by weight:

| | |
|---|---|
| $SiO_2$ | 52-67% |
| $Al_2O_3$ | 12-24% |
| $SiO_2 + Al_2O_3$ | <82% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| $CaO + MgO + SrO$ | 10-24% |
| CaO | <16% |
| MgO | 6-12% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the composition comprises the following components expressed as percentage amounts by weight:

| | |
|---|---|
| $SiO_2$ | 54-64% |
| $Al_2O_3$ | 13-23% |
| $SiO_2 + Al_2O_3$ | <82% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| $CaO + MgO + SrO$ | 10-24% |
| CaO | <14% |
| MgO | 6-12% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the composition comprises the following components expressed as percentage amounts by weight:

| | |
|---|---|
| $SiO_2$ | 54-62% |
| $Al_2O_3$ | 13-22% |
| $SiO_2 + Al_2O_3$ | 70-81% |
| $Sm_2O_3 + Gd_2O_3$ | 0.1-4% |
| $R_2O = Li_2O + Na_2O + K_2O$ | <2% |
| $Li_2O$ | 0.1-1.5% |
| $CaO + MgO + SrO$ | 10-24% |
| CaO | <14% |
| MgO | 6-12% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than or equal to 0.02.

In a class of this embodiment, the composition comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $Y_2O_3$ | 0.05-5% |
| $R_2O = Li_2O + Na_2O + K_2O$ | <2% |
| $Li_2O$ | 0.1-1.5% |
| $CaO + MgO + SrO$ | 10-24% |
| CaO | <16% |
| MgO | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the composition comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $La_2O_3$ | 0.05-3% |
| $R_2O = Li_2O + Na_2O + K_2O$ | <2% |
| $Li_2O$ | 0.1-1.5% |
| $CaO + MgO + SrO$ | 10-24% |
| CaO | <16% |
| MgO | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

In a class of this embodiment, the content range of SrO is 0.1-2% in percentage amounts by weight.

In a class of this embodiment, the range of the weight percentage ratio $C1=(Li_2O+Sm_2O_3+Gd_2O_3)/Al_2O_3$ is 0.02-0.15.

In a class of this embodiment, the range of the weight percentage ratio $C2=Y_2O_3(Sm_2O_3+Gd_2O_3+Y_2O_3)$ is greater than 0.4.

In a class of this embodiment, the total weight percentage of $Gd_2O_3+La_2O_3$ is 0.5-1.5%.

In a class of this embodiment, the total weight percentage of $Gd_2O_3+La_2O_3+TiO_2$ is 1-3.5%.

In a class of this embodiment, the composition contains $CeO_2$ in a content of 0-1% in percentage amounts by weight.

According to another aspect of this invention, a glass fiber produced with the composition for producing a glass fiber is provided.

According to yet another aspect of this invention, a composite material incorporating the glass fiber is provided.

The main inventive points of the composition for producing a glass fiber according to this invention include: introducing the rare earth oxides $Sm_2O_3$ and $Gd_2O_3$ so as to utilize the high accumulation effect and good synergistic effect between these two ions that have small radiuses and high field strength, controlling the ratio of $(Li_2O+Sm_2O_3+Gd_2O_3)/Al_2O_3$, reasonably configuring the content ranges of $Sm_2O_3$, $Gd_2O_3$, $Li_2O$, $Al_2O_3$, CaO, MgO and CaO+MgO+SrO respectively, utilizing the mixed alkali earth effect of CaO, MgO and SrO, and selectively introducing $Y_2O_3$, $La_2O_3$ and $CeO_2$ at appropriate amounts.

Specifically, the composition for producing a glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $R_2O = Li_2O + Na_2O + K_2O$ | <2% |
| $CaO + MgO + SrO$ | 10-24% |
| CaO | <16% |
| MgO | <13% |
| $TiO_2$ | <3% |
| $Fe_2O_3$ | <1.5% |

The effect and content of each component in the composition for producing a glass fiber is described as follows:

$SiO_2$ is a main oxide forming the glass network and has the effect of stabilizing all the components. In the composition for producing a glass fiber of the present invention, the content range of $SiO_2$ is 52-67%. Preferably, the $SiO_2$ content range can be 54-64%, and more preferably can be 54-62%.

$Al_2O_3$ is another main oxide forming the glass network. When combined with $SiO_2$, it can have a substantive effect on the mechanical properties and thermal stability of the glass. Too low of an $Al_2O_3$ content will make it impossible to obtain sufficiently high mechanical properties and thermal stability; too high of a content will significantly increase the viscosity of glass, thereby causing refining difficulties and high crystallization risks. In the composition for producing a glass fiber of the present invention, the content range of $Al_2O_3$ is 12-24%. Preferably, the $Al_2O_3$ content can be 13-23%, and more preferably can be 13-22%.

In a glass system, $Al_2O_3$ is typically present in two forms, i.e., the four-coordinated $[AlO_4]$ and the six-coordinated $[AlO_6]$. In the composition for producing a glass fiber of the present invention, the rare earth oxides $Sm_2O_3$ and/or $Gd_2O_3$ can be introduced. In accordance with the lanthanide contraction effect, on the one hand, these two oxides have high alkalinity and can provide considerable non-bridging oxygen, which helps to produce more four-coordinated $[AlO_4]$ in the glass structure and is thus advantageous for $Al^{3+}$ ions to enter the glass network so as to strengthen the compactness of the glass; and, on the other hand, with small ionic radiuses, high electric charges and high field strength, the $Sm^{3+}$ and $Gd^{3+}$ ions are usually present as external ions at the gaps of the glass network, and they have a strong accumulation effect on anions, further strengthening the structural stability of glass and increasing the mechanical properties and thermal stability of glass.

Meanwhile, under such strong accumulation effect, the movement and rearrangement of other ions will be effectively inhibited, so that the thermal stability of glass can be improved and the glass crystallization tendency can be reduced. Furthermore, with similar ionic radiuses and coordination states, the $Sm^{3+}$ and $Gd^{3+}$ ions can have a good synergistic effect and an excellent result can be achieved by using the two ions simultaneously. Therefore, in the composition for producing a glass fiber of the present invention, the combined weight percentage of $Sm_2O_3+Gd_2O_3$ can be 0.05-4.5%, and preferably can be 0.1-4%. Further, the $Sm_2O_3$ content can be 0.05-3%. Further, the $Gd_2O_3$ content can be 0.05-2%. In addition, the combined weight percentage of $SiO_2+Al_2O_3$ can be less than 82%, and preferably can be 70-81%.

Both $K_2O$ and $Na_2O$ can reduce glass viscosity and are good fluxing agents. Compared with $Na_2O$ and $K_2O$, $Li_2O$ can not only significantly reduce glass viscosity thereby improving the glass melting performance, but also obviously help improve the mechanical properties of glass. In addition, a small amount of $Li_2O$ provides considerable free oxygen, which helps more aluminum ions to form tetrahedral coordination and enhances the network structure of the glass. However, as too many alkali metal ions in the glass composition would affect the thermal and chemical stabilities of the glass, the introduced amount should be limited. Therefore, in the composition for producing a glass fiber of the present invention, the total content range of $Li_2O+Na_2O+K_2O$ is lower than 2%. Further, the content range of $Li_2O$ is 0.1-1.5%.

In addition, in order to help more aluminum ions to enter the glass network to form tetrahedral coordination, in the composition for producing a glass fiber of the present invention, the weight percentage ratio $C1=(Li_2O+Sm_2O_3+Gd_2O_3)/Al_2O_3$ can be greater than 0.01, preferably can be greater than or equal to 0.02, and more preferably can be 0.02-0.15.

Further, the rare earth oxides $Y_2O_3$ and $La_2O_3$ can be selectively introduced to the glass fiber composition of this invention. As the coordination states, ionic radiuses and field strength of $Y^{3+}$ and $La^{3+}$ ions are different from those of $Sm^{3+}$ and $Gd^{3+}$, when used simultaneously, these four ions could offer the following advantages: (1) more coordination states of the ions outside the glass network would be produced, which helps to enhance the structural stability of the glass; (2) the hexa-coordination of yttrium ions assisted by the octahedron of other ions would further enhance the structural integrity and modulus of the glass; and (3) it would be less likely for the ions to form regular arrangements at lowered temperatures, which help to reduce the growth rate of crystal phases and thus further increase the resistance to glass crystallization. However, compared with $Sm_2O_3$ and $Gd_2O_3$, $Y_2O_3$ and $La_2O_3$ are weak alkalines and, when used in a large amount, alkali metal oxides would be needed to provide a certain amount of free oxygen for filling in the vacancies. Therefore, in the composition for producing a glass fiber of the present invention, the weight percentage of $Y_2O_3$ can be 0.05-5% and the weight percentage of $La_2O_3$ can be 0.05-3%. In order to increase the mechanical properties of the glass, the weight percentage ratio $C2=Y_2O_3/(Sm_2O_3+Gd_2O_3+Y_2O_3)$ can be greater than 0.4. The inventors also find that the use of gadolinium oxide in combination with lanthanum oxide would play a significant role in improving the thermal stability of the glass. Further, the combined weight percentage of $Gd_2O_3+La_2O_3$ can be 0.5-1.5%.

CaO, MgO and SrO primarily have the effect of controlling the glass crystallization and regulating the glass viscosity. Particularly on the control of the glass crystallization, the inventors have obtained unexpected effects by controlling the introduced amounts of them and the ratios between them. Generally, for a high-performance glass based on the MgO—CaO—$Al_2O_3$—$SiO_2$ system, the crystal phases it contains after glass crystallization include mainly diopside ($CaMgSi_2O_6$) and anorthite ($CaAl_2Si_2O_8$). In order to effectively inhibit the tendency for these two crystal phases to crystallize and decrease the glass liquidus temperature and the rate of crystallization, this invention has rationally controlled the total content of CaO+MgO+SrO and the ratios between them and utilized the mixed alkali earth effect to form a compact stacking structure, so that more energy are needed for the crystal nucleases to form and grow. In this way, the glass crystallization tendency is inhibited. Further, a glass system containing strontium oxide has more stable glass structure, thus improving the glass properties. In the composition for producing a glass fiber of the present invention, the range of the total content of CaO+MgO+SrO can be 10-24%. As a network modifier, too much CaO would increase the crystallization tendency of the glass that lead to the precipitation of crystals such as anorthite and wollastonite from the glass melt. Therefore, the content range of CaO in this invention can be less than 16%, and preferably less than 14%. MgO has the similar effect in the glass network as CaO, yet the field strength of $Mg^{2+}$ is higher, which plays an important role in increasing the glass modulus. In the composition for producing a glass fiber of the present invention, the content range of MgO can be less than 13%, and preferably can be 6-12%. Further, the content range of SrO can be less than 3%, and preferably can be 0.1-2%.

$TiO_2$ has not only a certain fluxing effect, but also can significantly enhance the thermal and chemical stabilities of the glass. The inventors have found that the thermal stability of the glass would be greatly increased as a result of the use of $TiO_2$ in combination with gadolinium oxide and lanthanum oxide. However, since an excessive amount of $Ti^{4+}$ ions could have a certain coloring effect on the glass, the introduced amount should be limited. Therefore, in the composition for producing a glass fiber of the present invention, the content range of $TiO_2$ is lower than 3%. Further, the total content range of $Gd_2O_3+La_2O_3+TiO_2$ can be 1-3.5%.

$Fe_2O_3$ facilitates the melting of glass and can also improve the crystallization performance of glass. However, since ferric ions and ferrous ions have a coloring effect, the introduced amount should be limited. Therefore, in the composition for producing a glass fiber of the present invention, the content range of $Fe_2O_3$ can be less than 1.5%.

In the composition for producing a glass fiber of the present invention, an appropriate amount of $CeO_2$ can be selectively introduced to further improve the glass crystallization and refining performance. In the composition for producing a glass fiber of the present invention, the $CeO_2$ content can be 0-1%.

In addition, the composition for producing a glass fiber of the present invention can include small amounts of other components with a total content not greater than 2%.

In the composition for producing a glass fiber of the present invention, the beneficial effects produced by the aforementioned selected ranges of the components will be explained by way of examples through the specific experimental data.

The following are examples of preferred content ranges of the components contained in the composition for producing a glass fiber according to the present invention, wherein the glass fiber obtained therefrom has an elastic modulus greater than 90 GPa.

Composition 1

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| CaO + MgO + SrO | 10-24% |
| CaO | <16% |
| MgO | <13% |
| $TiO_2$ | <3% |
| $Fe_2O_3$ | <1.5% |

In addition, the weight percentage ratio C1=($Li_2O$+$Sm_2O_3$+$Gd_2O_3$)/$Al_2O_3$ is greater than 0.01.

Composition 2

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $SiO_2 + Al_2O_3$ | <82% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| CaO + MgO + SrO | 10-24% |
| CaO | <16% |
| MgO | 6-12% |
| $TiO_2$ | <3% |
| $Fe_2O_3$ | <1.5% |

In addition, the weight percentage ratio C1=($Li_2O$+$Sm_2O_3$+$Gd_2O_3$)/$Al_2O_3$ is greater than 0.01.

Composition 3

The composition for producing a high performance glass fiber according to the present invention comprises the following components expressed as percentage amounts by weight:

| | |
|---|---|
| $SiO_2$ | 54-64% |
| $Al_2O_3$ | 13-23% |
| $SiO_2 + Al_2O_3$ | <82% |
| $Sm_2O_3 + Gd_2O_3$ | 0.05-4.5% |
| $R_2O = Li_2O + Na_2O + K_2O$ | <2% |
| $Li_2O$ | 0.1-1.5% |
| CaO + MgO + SrO | 10-24% |
| CaO | <14% |
| MgO | 6-12% |
| $TiO_2$ | <3% |
| $Fe_2O_3$ | <1.5% |

In addition, the weight percentage ratio C1=($Li_2O$+$Sm_2O_3$+$Gd_2O_3$)/$Al_2O_3$ is greater than 0.01.

Composition 4

The composition for producing a high performance glass fiber according to the present invention comprises the following components expressed as percentage amounts by weight:

| | |
|---|---|
| $SiO_2$ | 54-62% |
| $Al_2O_3$ | 13-22% |
| $SiO_2 + Al_2O_3$ | 70-81% |
| $Sm_2O_3 + Gd_2O_3$ | 0.1-4% |
| $R_2O = Li_2O + Na_2O + K_2O$ | <2% |
| $Li_2O$ | 0.1-1.5% |
| $CaO + MgO + SrO$ | 10-24% |
| $CaO$ | <14% |
| $MgO$ | 6-12% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than or equal to 0.02.

Composition 5

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $Y_2O_3$ | 0.05-5% |
| $R_2O = Li_2O + Na_2O + K_2O$ | <2% |
| $Li_2O$ | 0.1-1.5% |
| $CaO + MgO + SrO$ | 10-24% |
| $CaO$ | <16% |
| $MgO$ | <13% |
| $TiO_2$ | <3% |
| $Fe_2O_3$ | <1.5% |
| $CeO_2$ | 0-1% |

In addition, the weight percentage ratio $C1=(Li_2O+Sm_2O_3+Gd_2O_3)/Al_2O_3$ is greater than 0.01.

Composition 6

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $La_2O_3$ | 0.05-3% |
| $R_2O = Li_2O + Na_2O + K_2O$ | <2% |
| $Li_2O$ | 0.1-1.5% |
| $CaO + MgO + SrO$ | 10-24% |
| $CaO$ | <16% |
| $MgO$ | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

Composition 7

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $Y_2O_3$ | 0.05-5% |
| $R_2O = Li_2O + Na_2O + K_2O$ | <2% |
| $Li_2O$ | 0.1-1.5% |
| $CaO + MgO + SrO$ | 10-24% |
| $CaO$ | <16% |
| $MgO$ | <13% |
| $SrO$ | 0.1-2% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01.

Composition 8

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $Y_2O_3$ | 0.05-5% |
| $R_2O = Li_2O + Na_2O + K_2O$ | <2% |
| $Li_2O$ | 0.1-1.5% |
| $CaO + MgO + SrO$ | 10-24% |
| $CaO$ | <16% |
| $MgO$ | <13% |
| $TiO_2$ | <3% |
| $Fe_2O_3$ | <1.5% |

In addition, the range of the weight percentage ratio $C1=(Li_2O+Sm_2O_3+Gd_2O_3)/Al_2O_3$ is 0.02-0.15.

Composition 9

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $Y_2O_3$ | 0.05-5% |
| $Sm_2O_3$ | 0.05-3% |
| $R_2O = Li_2O + Na_2O + K_2O$ | <2% |
| $Li_2O$ | 0.1-1.5% |
| $CaO + MgO + SrO$ | 10-24% |
| $CaO$ | <16% |
| $MgO$ | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01, and the weight percentage ratio $C2=Y_2O_3/(Sm_2O_3+Gd_2O_3+Y_2O_3)$ is greater than 0.4.

The glass fiber made from a composition according to composition 9 has an elastic modulus of greater than 95 GPa.

Composition 10

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $La_2O_3$ | 0.05-3% |
| $Gd_2O_3 + La_2O_3$ | 0.5-1.5% |
| $R_2O = Li_2O + Na_2O + K_2O$ | <2% |
| $Li_2O$ | 0.1-1.5% |

-continued

| | |
|---|---|
| CaO + MgO + SrO | 10-24% |
| CaO | <16% |
| MgO | <13% |
| $TiO_2$ | <3% |
| $Fe_2O_3$ | <1.5% |

In addition, the weight percentage ratio $C1=(Li_2O+Sm_2O_3+Gd_2O_3)/Al_2O_3$ is greater than 0.01

Composition 11

The composition for producing a high performance glass fiber according to the present invention comprises the following components expressed as percentage amounts by weight:

| | |
|---|---|
| $SiO_2$ | 52-67% |
| $Al_2O_3$ | 12-24% |
| $Sm_2O_3 + Gd_2O_3$ | 0.05-4.5% |
| $La_2O_3$ | 0.05-3% |
| $Gd_2O_3 + La_2O_3 + TiO_2$ | 1-3.5% |
| $R_2O = Li_2O + Na_2O + K_2O$ | <2% |
| $Li_2O$ | 0.1-1.5% |
| CaO + MgO + SrO | 10-24% |
| CaO | <16% |
| MgO | <13% |
| $TiO_2$ | <3% |
| $Fe_2O_3$ | <1.5% |
| $Gd_2O_3$ | 0.05-2% |

In addition, the weight percentage ratio $C1=(Li_2O+Sm_2O_3+Gd_2O_3)/Al_2O_3$ is greater than 0.01

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the composition for producing a glass fiber expressed as percentage amounts by weight are: 52-67% of $SiO_2$, 12-24% of $Al_2O_3$, 0.05-4.5% of $Sm_2O_3+Gd_2O_3$, less than 2% of $Li_2O+Na_2O+K_2O$, 10-24% of $CaO+MgO+SrO$, less than 16% of CaO, less than 13% of MgO, less than 3% of $TiO_2$, and less than 1.5% of $Fe_2O_3$. The composition can not only greatly increase the mechanical properties and thermal stability of the glass, but also significantly lower the glass liquidus and forming temperatures and crystallization rate of the glass under equal conditions, which make it particularly suitable for the production of high-performance glass fiber having excellent thermal stability with refractory-lined furnaces.

The specific content values of SiO2, Al2O3, Sm2O3, Gd2O3, Y2O3, La2O3, CaO, MgO, Li2O, Na2O, K2O, Fe2O3, TiO2 and SrO in the composition for producing a glass fiber of the present invention are selected to be used in the examples, and comparisons with S glass, traditional R glass and improved R glass are made in terms of the following six property parameters, (1) Forming temperature, the temperature at which the glass melt has a viscosity of 103 poise.
(2) Liquidus temperature, the temperature at which the crystal nucleuses begin to form when the glass melt cools off—i.e., the upper limit temperature for glass crystallization.
(3) ΔT value, which is the difference between the forming temperature and the liquidus temperature and indicates the temperature range at which fiber drawing can be performed.
(4) Peak crystallization temperature, the temperature which corresponds to the strongest peak of glass crystallization during the DTA testing. Generally, the higher this temperature is, the more energy is needed by crystal nucleuses to grow and the lower the glass crystallization tendency is.
(5) Elastic modulus, the linear elastic modulus defining the ability of glass to resist elastic deformation, which is to be measured as per ASTM2343.
(6) Softening temperature, the temperature at which the standardized specimens extend by 1 mm per minute when subject to a heating-up process at a rate of 5±1° C./min in a standardized furnace.

The aforementioned six parameters and the methods of measuring them are well-known to one skilled in the art. Therefore, these parameters can be effectively used to explain the properties of the glass fiber composition of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirements.

The exemplary embodiments of the glass fiber composition according to the present invention are given below.

Example 1

| | |
|---|---|
| $SiO_2$ | 60.2% |
| $Al_2O_3$ | 16.6% |
| CaO | 9.7% |
| MgO | 9.2% |
| $Sm_2O_3$ | 0.9% |
| $Na_2O$ | 0.21% |
| $K_2O$ | 0.43% |
| $Li_2O$ | 0.60% |
| $Fe_2O_3$ | 0.44% |
| $TiO_2$ | 0.48% |
| SrO | 1.0% |

In addition, the weight percentage ratio $C1=(Li_2O+Sm_2O_3+Gd_2O_3)/Al_2O_3$ is 0.09.

In Example 1, the measured values of the six parameters are respectively:

| | |
|---|---|
| Forming temperature | 1298° C. |
| Liquidus temperature | 1203° C. |

Example 2

| | |
|---|---|
| SiO$_2$ | 58.0% |
| Al$_2$O$_3$ | 19.0% |
| CaO | 9.9% |
| MgO | 9.2% |
| Sm$_2$O$_3$ | 0.4% |
| Na$_2$O | 0.23% |
| K$_2$O | 0.43% |
| Li$_2$O | 0.60% |
| Fe$_2$O$_3$ | 0.44% |
| TiO$_2$ | 0.56% |
| SrO | 1.0% |

In addition, the weight percentage ratio C1=(Li$_2$O+Sm$_2$O$_3$+Gd$_2$O$_3$)/Al$_2$O$_3$ is 0.053.

In Example 2, the measured values of the six parameters are respectively:

| | |
|---|---|
| Forming temperature | 1294° C. |
| Liquidus temperature | 1209° C. |
| ΔT | 85° C. |
| Peak crystallization temperature | 1027° C. |
| Elastic modulus | 92.8 GPa |
| Softening temperature | 932° C. |

Example 3

| | |
|---|---|
| SiO$_2$ | 59.3% |
| Al$_2$O$_3$ | 17.4% |
| CaO | 8.2% |
| MgO | 10.6% |
| Gd$_2$O$_3$ | 0.3% |
| Sm$_2$O$_3$ | 1.5% |
| Na$_2$O | 0.23% |
| K$_2$O | 0.38% |
| Li$_2$O | 0.65% |
| Fe$_2$O$_3$ | 0.44% |
| TiO$_2$ | 0.53% |

In addition, the weight percentage ratio C1=(Li$_2$O+Sm$_2$O$_3$+Gd$_2$O$_3$)/Al$_2$O$_3$ is 0.141.

In Example 3, the measured values of the six parameters are respectively:

| | |
|---|---|
| Forming temperature | 1295° C. |
| Liquidus temperature | 1207° C. |
| ΔT | 88° C. |
| Peak crystallization temperature | 1029° C. |
| Elastic modulus | 94.4 GPa |
| Softening temperature | 936° C. |

Example 4

| | |
|---|---|
| SiO$_2$ | 59.6% |
| Al$_2$O$_3$ | 16.9% |
| CaO | 7.6% |
| MgO | 9.6% |
| Sm$_2$O$_3$ | 0.5% |
| Y$_2$O$_3$ | 3.5% |
| Na$_2$O | 0.21% |
| K$_2$O | 0.41% |
| Li$_2$O | 0.50% |
| Fe$_2$O$_3$ | 0.44% |
| TiO$_2$ | 0.50% |

In addition, the weight percentage ratio C1=(Li$_2$O+Sm$_2$O$_3$+Gd$_2$O$_3$)/Al$_2$O$_3$ is 0.059, and the weight percentage ratio C2=Y$_2$O$_3$/(Sm$_2$O$_3$+Gd$_2$O$_3$+Y$_2$O$_3$) is 0.88.

In Example 4, the measured values of the six parameters are respectively:

| | |
|---|---|
| Forming temperature | 1296° C. |
| Liquidus temperature | 1197° C. |
| ΔT | 99° C. |
| Peak crystallization temperature | 1034° C. |
| Elastic modulus | 97.3 GPa |
| Softening temperature | 943° C. |

Example 5

| | |
|---|---|
| SiO$_2$ | 59.1% |
| Al$_2$O$_3$ | 17.5% |
| CaO | 8.5% |
| MgO | 10.5% |
| Gd$_2$O$_3$ | 0.5% |
| La$_2$O$_3$ | 1.0% |
| Na$_2$O | 0.21% |
| K$_2$O | 0.38% |
| Li$_2$O | 0.75% |
| Fe$_2$O$_3$ | 0.44% |
| TiO$_2$ | 0.88% |

In addition, the weight percentage ratio C1=(Li$_2$O+Sm$_2$O$_3$+Gd$_2$O$_3$)/Al$_2$O$_3$ is 0.071.

In Example 5, the measured values of the six parameters are respectively:

| | |
|---|---|
| Forming temperature | 1295° C. |
| Liquidus temperature | 1208° C. |
| ΔT | 87° C. |
| Peak crystallization temperature | 1027° C. |
| Elastic modulus | 94.0 GPa |
| Softening temperature | 940° C. |

Example 6

| | |
|---|---|
| SiO$_2$ | 58.0% |
| Al$_2$O$_3$ | 19.0% |
| CaO | 9.9% |
| MgO | 9.2% |
| Gd$_2$O$_3$ | 0.4% |
| Na$_2$O | 0.23% |
| K$_2$O | 0.43% |
| Li$_2$O | 0.60% |

-continued

| | |
|---|---|
| ΔT | 95° C. |
| Peak crystallization temperature | 1032° C. |
| Elastic modulus | 93.6 GPa |
| Softening temperature | 934° C. |

| | |
|---|---|
| $Fe_2O_3$ | 0.44% |
| $TiO_2$ | 0.56% |
| SrO | 1.0% |

In addition, the weight percentage ratio $C1=(Li_2O+Sm_2O_3+Gd_2O_3)/Al_2O_3$ is 0.053.

In Example 6, the measured values of the six parameters are respectively:

| | |
|---|---|
| Forming temperature | 1292° C. |
| Liquidus temperature | 1206° C. |
| ΔT | 86° C. |
| Peak crystallization temperature | 1029° C. |
| Elastic modulus | 93.0 GPa |
| Softening temperature | 933° C. |

Comparisons of the property parameters of the aforementioned examples and other examples of the glass fiber composition of the present invention with those of the S glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A | | | | | | | |
|---|---|---|---|---|---|---|---|---|---|
| | | | A1 | A2 | A3 | A4 | A5 | A6 | A7 |
| Component | $SiO_2$ | | 59.6 | 60.0 | 60.3 | 59.6 | 59.0 | 59.4 | 59.3 |
| | $Al_2O_3$ | | 16.1 | 16.1 | 15.8 | 16.8 | 15.6 | 16.6 | 17.4 |
| | CaO | | 11.2 | 9.9 | 9.5 | 6.5 | 14.1 | 11.5 | 8.2 |
| | MgO | | 8.9 | 9.8 | 10.0 | 11.0 | 8.0 | 9.1 | 10.6 |
| | $Gd_2O_3$ | | — | — | 1.0 | — | — | — | 0.3 |
| | $Sm_2O_3$ | | 0.8 | 0.8 | — | 1.0 | 0.6 | 0.4 | 1.5 |
| | $Y_2O_3$ | | — | — | — | 2.4 | — | 0.6 | — |
| | $La_2O_3$ | | — | — | — | 0.4 | 0.4 | — | — |
| | $Na_2O$ | | 0.24 | 0.24 | 0.24 | 0.19 | 0.23 | 0.23 | 0.23 |
| | $K_2O$ | | 0.61 | 0.61 | 0.61 | 0.28 | 0.38 | 0.38 | 0.38 |
| | $Li_2O$ | | 0.50 | 0.50 | 0.50 | 0.60 | 0.60 | 0.60 | 0.65 |
| | $Fe_2O_3$ | | 0.44 | 0.44 | 0.44 | 0.44 | 0.44 | 0.44 | 0.44 |
| | $TiO_2$ | | 0.48 | 0.48 | 0.48 | 0.53 | 0.41 | 0.41 | 0.53 |
| | SrO | | 0.9 | 0.9 | 0.9 | — | — | — | — |
| Ratio | C1 | | 0.081 | 0.081 | 0.095 | 0.096 | 0.077 | 0.06 | 0.141 |
| | C2 | | — | — | — | 0.71 | — | — | — |
| Parameter | Forming temperature/ ° C. | | 1286 | 1293 | 1291 | 1296 | 1286 | 1293 | 1295 |
| | Liquidus temperature/ ° C. | | 1196 | 1203 | 1200 | 1209 | 1206 | 1203 | 1207 |
| | ΔT/° C. | | 90 | 90 | 91 | 87 | 80 | 90 | 88 |
| | Peak crystallization temperature/ ° C. | | 1034 | 1030 | 1032 | 1030 | 1028 | 1030 | 1029 |
| | Elastic modulus/ GPa | | 93.0 | 93.6 | 94.2 | 97.1 | 92.0 | 92.8 | 94.4 |
| | Softening temperature/ ° C. | | 931 | 933 | 935 | 940 | 926 | 932 | 936 |

| | | B | | | | | | | |
|---|---|---|---|---|---|---|---|---|---|
| | | | A8 | A9 | A10 | A11 | A12 | A13 | A14 |
| Component | $SiO_2$ | | 59.6 | 59.6 | 59.6 | 59.4 | 59.1 | 58.4 | 59.5 |
| | $Al_2O_3$ | | 16.9 | 16.9 | 16.9 | 16.9 | 17.5 | 19.1 | 16.4 |
| | CaO | | 8.3 | 7.6 | 7.9 | 9.7 | 8.5 | 9.5 | 10.8 |
| | MgO | | 9.6 | 9.6 | 9.6 | 9.3 | 10.5 | 9.8 | 9.2 |
| | $Gd_2O_3$ | | — | — | — | — | 0.5 | 0.2 | — |
| | $Sm_2O_3$ | | 0.5 | 0.5 | 0.9 | 2.0 | — | — | 0.2 |
| | $Y_2O_3$ | | 2.8 | 3.5 | 2.8 | — | — | 0.3 | — |
| | $La_2O_3$ | | — | — | — | 0.2 | 1.0 | — | — |
| | $Na_2O$ | | 0.21 | 0.21 | 0.21 | 0.21 | 0.21 | 0.28 | 0.21 |
| | $K_2O$ | | 0.41 | 0.41 | 0.41 | 0.38 | 0.38 | 0.51 | 0.51 |
| | $Li_2O$ | | 0.50 | 0.50 | 0.50 | 0.75 | 0.75 | 0.60 | 0.50 |
| | $Fe_2O_3$ | | 0.44 | 0.44 | 0.44 | 0.44 | 0.44 | 0.44 | 0.44 |
| | $TiO_2$ | | 0.50 | 0.50 | 0.50 | 0.48 | 0.88 | 0.63 | 1.1 |
| | SrO | | — | — | — | — | — | — | 0.9 |
| Ratio | C1 | | 0.059 | 0.059 | 0.083 | 0.163 | 0.071 | 0.042 | 0.043 |
| | C2 | | 0.85 | 0.88 | 0.76 | — | — | 0.60 | — |

TABLE 1-continued

| Parameter | | | | | | | | |
|---|---|---|---|---|---|---|---|---|
| | Forming temperature/° C. | 1298 | 1296 | 1297 | 1300 | 1295 | 1299 | 1290 |
| | Liquidus temperature/° C. | 1202 | 1197 | 1199 | 1204 | 1208 | 1206 | 1198 |
| | ΔT/° C. | 96 | 99 | 98 | 96 | 87 | 93 | 92 |
| | Peak crystallization temperature/° C. | 1031 | 1034 | 1032 | 1030 | 1027 | 1029 | 1033 |
| | Elastic modulus/ GPa | 96.3 | 97.3 | 96.5 | 93.7 | 94.0 | 93.8 | 92.4 |
| | Softening temperature/° C. | 938 | 943 | 940 | 936 | 940 | 933 | 934 |

C

| | | A15 | A16 | A17 | A18 | S glass | Traditional R glass | Improved R glass |
|---|---|---|---|---|---|---|---|---|
| Component | SiO₂ | 60.2 | 58.0 | 58.0 | 58.0 | 65 | 60 | 60.75 |
| | Al₂O₃ | 16.6 | 18.8 | 19.0 | 19.0 | 25 | 25 | 15.80 |
| | CaO | 9.7 | 9.7 | 9.9 | 9.9 | — | 9 | 13.90 |
| | MgO | 9.2 | 9.2 | 9.2 | 9.2 | 10 | 6 | 7.90 |
| | Gd₂O₃ | — | 0.4 | 0.4 | — | — | — | — |
| | Sm₂O₃ | 0.9 | 0.4 | — | 0.4 | — | — | — |
| | Na₂O | 0.21 | 0.23 | 0.23 | 0.23 | trace amount | trace amount | 0.73 |
| | K₂O | 0.43 | 0.43 | 0.43 | 0.43 | trace amount | trace amount | — |
| | Li₂O | 0.60 | 0.60 | 0.60 | 0.60 | — | — | 0.48 |
| | Fe₂O₃ | 0.44 | 0.44 | 0.44 | 0.44 | trace amount | trace amount | 0.18 |
| | TiO₂ | 0.48 | 0.56 | 0.56 | 0.56 | trace amount | trace amount | 0.12 |
| | SrO | 1.0 | 1.0 | 1.0 | 1.0 | — | — | — |
| Ratio | C1 | 0.09 | 0.074 | 0.053 | 0.053 | — | — | — |
| Ratio | C2 | — | — | — | — | — | — | — |
| | Forming temperature/° C. | 1298 | 1290 | 1292 | 1294 | 1571 | 1430 | 1278 |
| | Liquidus temperature/° C. | 1203 | 1202 | 1206 | 1209 | 1470 | 1350 | 1210 |
| | ΔT/° C. | 95 | 88 | 86 | 85 | 101 | 80 | 68 |
| | Peak crystallization temperature/° C. | 1032 | 1031 | 1029 | 1027 | — | 1010 | 1016 |
| | Elastic modulus/ GPa | 93.6 | 94.4 | 93.0 | 92.8 | 89 | 88 | 87 |
| | Softening temperature/° C. | 934 | 937 | 933 | 932 | — | — | 920 |

It can be seen from the values in the above tables that, compared with the S glass and traditional R glass, the glass fiber composition of the present invention has the following advantages: (1) much higher elastic modulus; (2) much lower liquidus temperature, which helps to reduce crystallization risk and increase the fiber drawing efficiency; relatively high peak crystallization temperature, which indicates that more energy is needed for the formation and growth of crystal nucleuses during the crystallization process of glass, i.e. the crystallization risk of the glass of the present invention is smaller under equal conditions.

At the same time, compared with the improved R glass, the glass fiber composition of the present invention has the following advantages: (1) much higher elastic modulus; (2) relatively high peak crystallization temperature, which indicates that more energy is needed for the formation and growth of crystal nucleuses during the crystallization process of glass, i.e. the crystallization risk of the glass of the present invention is smaller under equal conditions; and lower liquidus temperature, which helps to reduce crystallization risk and increase the fiber drawing efficiency; (3) significantly increased softening temperature, which means the thermal stability of the glass has been significantly improved.

Both S glass and traditional R glass cannot enable the achievement of large-scale production with refractory-lined furnaces and, with respect to improved R glass, part of the glass properties is compromised to reduce the liquidus temperature and forming temperature, so that the production difficulty is decreased and the production with refractory-lined furnaces could be achieved. By contrast, the glass fiber composition of the present invention not only has a sufficiently low liquidus temperature and crystallization rate which permit the production with refractory-lined furnaces, but also significantly increases the glass modulus, thereby resolving the technical bottleneck that the modulus of S glass fiber and R glass fiber cannot be improved with the growth of production scale.

The composition for producing a glass fiber according to the present invention can be used for making glass fibers having the aforementioned properties.

The composition for producing a glass fiber according to the present invention in combination with one or more organic and/or inorganic materials can be used for preparing composite materials having improved characteristics, such as glass fiber reinforced base materials.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by such phrase as "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The composition for producing a glass fiber of the present invention not only has a sufficiently low liquidus temperature and crystallization rate which enable the production with refractory-lined furnaces, but also significantly increases the glass modulus, thereby resolving the technical bottleneck that the modulus of S glass fiber and R glass fiber cannot be improved with the enhanced production scale. Compared with the current main-stream high-performance glasses, the glass fiber composition of the present invention has made a breakthrough in terms of elastic modulus, crystallization performance and thermal stability of the glass, with significantly improved modulus, remarkably reduced crystallization risk and improved thermal stability under equal conditions. Thus, the overall technical solution of the present invention is particularly suitable for the tank furnace production of a high performance glass fiber having excellent thermal stability

The invention claimed is:

1. A composition for producing a high performance glass fiber, comprising the following components with corresponding percentage amounts by weight:

| | |
|---|---|
| $SiO_2$ | 54-62% |
| $Al_2O_3$ | 12-24% |
| $Sm_2O_3 + Gd_2O_3$ | 0.05-4.5% |
| $Sm_2O_3$ | 0.05-3% |
| $R_2O = Li_2O + Na_2O + K_2O$ | <2% |
| $CaO + MgO + SrO$ | 12.5-24% |
| $CaO$ | greater than or equal to 6.5% and less than 16% |
| $MgO$ | 6-12% |
| $TiO_2$ | <3% |
| $Fe_2O_3$ | <1.5% | wherein, a weight percentage ratio $C1=(Li_2O+Sm_2O_3+Gd_2O_3)/Al_2O_3$ is 0.02-0.15.

2. The composition of claim 1, comprising 0.1-1.5 wt. % of $Li_2O$.

3. The composition of claim 1, wherein a combined weight percentage $SiO_2+Al_2O_3$ is less than 82%.

4. The composition of claim 1, comprising the following components with corresponding percentage amounts by weight:

| | |
|---|---|
| $SiO_2$ | 54-62% |
| $Al_2O_3$ | 12-24% |
| $SiO_2 + Al_2O_3$ | <82% |
| $Sm_2O_3 + Gd_2O_3$ | 0.05-4.5% |
| $Sm_2O_3$ | 0.05-3% |
| $R_2O = Li_2O + Na_2O + K_2O$ | <2% |
| $Li_2O$ | 0.1-1.5% |
| $CaO + MgO + SrO$ | 12.5-24% |
| $CaO$ | greater than or equal to 6.5% and less than 16% |
| $MgO$ | 6-12% |
| $TiO_2$ | <3% |
| $Fe_2O_3$ | <1.5% |

Wherein, a weight percentage ratio $C1=(Li_2O+Sm_2O_3+Gd_2O_3)/Al_2O_3$ is 0.02-0.15.

5. The composition of claim 1, further comprising 0.05-5 wt. % of $Y_2O_3$.

6. The composition of claim 5, wherein a weight percentage ratio $C2=Y_2O_3/(Sm_2O_3+Gd_2O_3+Y_2O_3)$ is greater than 0.4.

7. The composition of claim 1, comprising the following components with corresponding percentage amounts by weight:

| | |
|---|---|
| $SiO_2$ | 54-62% |
| $Al_2O_3$ | 12-24% |
| $Sm_2O_3 + Gd_2O_3$ | 0.05-4.5% |
| $Sm_2O_3$ | 0.05-3% |
| $Y_2O_3$ | 0.05-5% |
| $R_2O = Li_2O + Na_2O + K_2O$ | <2% |
| $Li_2O$ | 0.1-1.5% |
| $CaO + MgO + SrO$ | 12.5-24% |
| $CaO$ | greater than or equal to 6.5% and less than 16% |
| $MgO$ | 6-12% |
| $TiO_2$ | <3% |
| $Fe_2O_3$ | <1.5% |

Wherein, a weight percentage ratio $C1=(Li_2O+Sm_2O_3+Gd_2O_3)/Al_2O_3$ is 0.02-0.15.

8. The composition of claim 1, further comprising 0.05-3 wt. % of $La_2O_3$.

9. The composition of claim 8, wherein a combined weight percentage $Gd_2O_3+La_2O_3$ is 0.5%-1.5%.

10. The composition of claim 8, wherein a combined weight percentage $Gd_2O_3+La_2O_3+TiO_2$ is 1%-3.5%.

11. The composition of claim 1, comprising the following components with corresponding percentage amounts by weight:

| | |
|---|---|
| $SiO_2$ | 54-62% |
| $Al_2O_3$ | 12-24% |
| $Sm_2O_3 + Gd_2O_3$ | 0.05-4.5% |
| $Sm_2O_3$ | 0.05-3% |
| $La_2O_3$ | 0.05-3% |
| $R_2O = Li_2O + Na_2O + K_2O$ | <2% |
| $Li_2O$ | 0.1-1.5% |
| $CaO + MgO + SrO$ | 12.5-24% |
| $CaO$ | greater than or equal to 6.5% and less than 16% |
| $MgO$ | 6-12% |
| $TiO_2$ | <3% |
| $Fe_2O_3$ | <1.5% |

Wherein, a weight percentage ratio $C1=(Li_2O+Sm_2O_3+Gd_2O_3)/Al_2O_3$ is 0.02-0.15.

12. The composition of claim 1, comprising the following components with corresponding percentage amounts by weight:

| | |
|---|---|
| $SiO_2$ | 54-62% |
| $Al_2O_3$ | 13-22% |
| $SiO_2 + Al_2O_3$ | 70-81% |
| $Sm_2O_3 + Gd_2O_3$ | 0.1-4% |
| $Sm_2O_3$ | 0.05-3% |
| $R_2O = Li_2O + Na_2O + K_2O$ | <2% |
| $Li_2O$ | 0.1-1.5% |
| $CaO + MgO + SrO$ | 12.5-24% |
| $CaO$ | greater than or equal to 6.5% and less than 14% |
| $MgO$ | 6-12% |
| $TiO_2$ | <3% |
| $Fe_2O_3$ | <1.5% |

Wherein, a weight percentage ratio $C1=(Li_2O+Sm_2O_3+Gd_2O_3)/Al_2O_3$ is 0.02-0.15.

13. The composition of claim 1, comprising 0.1-2 wt. %.

14. The composition of claim 1, further comprising 0-1 wt. % of $CeO_2$.

15. A glass fiber, being produced using the composition of claim 1.

16. A composite material, comprising the glass fiber of claim 15.

* * * * *